United States Patent [19]
Engstrom et al.

[11] 3,990,901
[45] Nov. 9, 1976

[54] METHOD FOR THE PRODUCTION OF FOAM CERAMICS AND SHAPED ARTICLES THEREOF

[75] Inventors: Bengt Engstrom, Uttran; Gösta Persson, Bromolla, both of Sweden

[73] Assignee: Euroc Development AB, Malmo, Sweden

[22] Filed: Feb. 12, 1975

[21] Appl. No.: 549,227

Related U.S. Application Data

[63] Continuation of Ser. No. 319,075, Dec. 27, 1972, abandoned.

[30] Foreign Application Priority Data
Dec. 30, 1971 Sweden............................ 16907/71

[52] U.S. Cl. ............................ 106/40 V; 106/40 R; 106/75; 106/117; 264/43
[51] Int. Cl.$^2$.................... C03C 3/22; C04B 31/00; C04B 35/16
[58] Field of Search.................. 106/40 V, 40 R, 41, 106/75, 117; 264/43, 44

[56] References Cited
UNITED STATES PATENTS

| | | | |
|---|---|---|---|
| 2,021,956 | 11/1935 | Gladney............................ | 106/40 V |
| 2,191,658 | 2/1940 | Haux................................ | 106/40 V |
| 2,310,432 | 2/1943 | Haux................................ | 106/40 V |
| 2,596,669 | 5/1952 | Ford ................................ | 106/40 V |
| 2,775,524 | 12/1956 | D'Eustachio...................... | 106/40 V |
| 3,321,414 | 5/1967 | Vieli ................................ | 106/40 V |
| 3,744,984 | 7/1973 | Sato................................. | 106/40 V |

*Primary Examiner*—Patrick P. Garvin
*Assistant Examiner*—John F. Niebling
*Attorney, Agent, or Firm*—Fred Philpitt

[57] ABSTRACT

A method for the production of foam ceramics or shaped articles of foam ceramics from an aqueous starting mixture containing components which on heating to a temperature between 700° and 1100°C form a viscous, sintered and porous mass, which comprises incorporating a hydraulic binder or latent hydraulic binder into the aqueous starting mixture to effect solidification of the latter.

10 Claims, No Drawings

METHOD FOR THE PRODUCTION OF FOAM CERAMICS AND SHAPED ARTICLES THEREOF

This is a continuation of application Ser. No. 319,075, filed Dec. 27, 1972 now abandoned.

The present invention relates to a method for the production of foam ceramics and shaped articles thereof from an aqueous mixture containing components, which, on heating to a temperature between 700° and 1100° C, form a sintered, viscous and porous mass.

Such methods form part of the prior art. It has thus been known for a long time how to produce porous products by heating an aqueous mixture containing waterglass and mineral granules of different types. According to the Swedish Pat. No. 216,078, the starting material for the production of foam ceramics is composed of an aqueous mixture which has been obtained by slurrying fibrous material in alkali silicate in the proportion of 0.02 – 0.7:1, i.e. a heavily aqueous suspension, which makes it necessary to introduce long and complicated drying and crushing of the mixture, before it can undergo heat treatment for conversion to foam ceramic. According to the published Swedish Pat. Application No. 11,990/60, and an application of addition to it, the starting material is composed of a waterglass solution containing one or several metal oxides, which can form resistent glass, this mixture being heated to sintering in one stage without intermediate fine distribution. Even with this method one is working with such large quantities of water present that disturbances occur when water is evolved in connection with heating to sintering. It has thus been found on firing bodies with the dimensions 30 by 30 by 70 cm in spite of careful increase in temperature, partly that large temperature differences appear in the body, and partly that steam from the interior of the body collects and forms starting places for cracks on cooling.

It has now been found that the above-mentioned disadvantages can be eliminated or in any case essentially reduced if, according to the invention, the aqueous starting mixture is added with a hydraulic or latent hydraulic binder, and the mixture obtained is broken down after solidifying into smaller particles, which ae possibly screened, on which the particles are subjected to heating. By a hydraulic binder is meant a binder capable of undergoing hardening with water without the assistance of air. By a latent hydraulic binder is meant a binder in itself capable of undergoing a very slow hardening with water, but reacting as the hydraulic binder in the presence of an accelerator. In this way it will be possible to start off from an aqueous mixture and thus in the water loss process avoid the disturbing effect of this component in pore formation. By the disintegration according to the invention, a material is obtained from which water can be evolved, essentially quicker and completely without disturbances. According to the invention, the starting material containing hydraulic binder in the form of a well-mixed product, e.g. a sludge, can be converted to a brittle body which is easy to break up, and can then be heated to sintering temperature partly while passing through a temperature range within which water is evolved and primary pore formation takes place, and partly a temperature range within which a secondary pore formation takes place, at which the first-formed pores are wholly or partly destroyed, and finer new pores are formed, which condition the structure of the finished foam ceramic.

An explanation of the good result according to the invention is that crushed granules of the starting mixture bonded by the binder can have better accessibility to heat. Especially during the second heating phase, when the fine pore structure of the foam ceramic arises (secondary pore formation) it is of great importance that heat is supplied to the material in such a way that too large temperature differences are avoided. By incorporating a hydraulic binder into the starting mixture another valuable effect is also achieved, in that the hydraulic binder combines with part of the mixing water so that gels are formed, which give off their water only at a higher temperature, at which the leaving steam can be reacted with reactive components to promote the secondary pore formation.

The method according to the invention can be technically shaped in the following manner. The raw materials are mixed by milling, kneading or in any other suitable way to form a very homogeneous mass or suspension. The latter is then brought to set under the influence of one or more hydraulic components, e.g. blast furnace slag. If the mixture, as is usually the case, contains free alkali which can originate from waterglass or an additive from an external source, and the hydraulic binder is Portland cement or aluminate cement, the alkali will serve as an accelerator for the cement.

If granulated blast furnace slag is used as the hydraulic binder, the alkali will serve as an accelerator for the slag. Bonding time can be increased by increasing the water content or possibly organic additives, or diminished by heating or reduction of the water content. As and when the bonding reactions have started, the bonding process is accelerated in that the reaction is exothermic.

After bonding a relatively hard mass is obtained, which is then broken up to a suitable granule size, e.g. 1 - 20 mm, by a rotary crusher or similar, whereafter the broken-up material obtained is possibly screened. Screened-off material can then possibly be returned to the raw material mixture.

The granular material can then be subjected to quick heating to 500° – 700° C, at which water is evolved while foaming due to the presence of alkali in the waterglass and alkali hydroxide respectively. It is of importance, especially if the material contains carbon or carbon compounds as agents to accomplish the final pore structure, to cater for its protection against oxidation, so that the carbon or carbon compounds are not oxidized and disappear in a gaseous state, before a close film of material has managed to be formed around each pellet of material. The material obtained now consists, generally speaking, of non-coherent more or less spherical pellets with a diameter between approx. 4 and approx. 40 mm.

During the heating process described above, a primary pore formation takes place in the material. The material expanded during this port formation is then transferred without breakingdown either directly or after cooling and possible screening either to a continuous belt, or to molds for a final firing at approx. 800° – 1000° C. During this second heating the material should also be protected against oxidation. At a temperature of something over approx. 700° C the cell walls in the pores which were formed earlier during the first furnace heating begin to sinter. The temperature is suitably maintained constant at 50° – 100° C under the final firing temperature in use until the whole mass, which earlier can have been given a certain shape, has been sintered all the way through.

During this time the reactions take place between the pore-forming agents so that the walls of the primary pores become porous and a large part of the primary pores are pushed together. Simultaneously as the pellets grow, the cavities between them diminish. On heating a further 50° – 100° C a magnification of the secondary pores takes place so that these cavities and a large part of the primary pores disappear, and the product obtains an even porous structure. Residues of the free alkaline are simultaneously bonded as well.

The product so provided with pores can then be quickly surface-cooled, after which it is allowed to cool slowly.

According to one embodiment of the invention, the aqueous starting mixture can be caused to contain an alkali compound preferably with such a content that the amount of $R_2O$, where R is an alkali metal atom, in the same reaches 4 – 13 %, calculated on the fired dry substance.

According to another embodiment of the invention, the aqueous starting mixture can be caused to contain so much hydraulic binder containing free and/or bonded CaO that the content preferably in the same reaches 3 – 7 %, calculated on the fired dry substance.

According to a further embodiment of the invention, the starting mixture can be caused to contain aluminium oxide to heighten the resistance to water of the foam ceramic obtained, at which the content of the same preferably amounts to at least 4 %, calculated on the fired dry substance.

According to an embodiment of the invention, the starting mixture can be caused to contain oxide of trivalent iron and reducing agents, preferably carbon or carbon compounds, so that in a final stage of the heating process, when a finely porous structure appears through so-called secondary pore formation, this may be accomplished.

According to the invention, the heating process is caused to proceed in two stages, the starting mixture in bonded form, and broken down into pieces being heated in a first stage to such a temperature that the water is evolved, and a primary pore formation takes place, and in a second stage such a temperature that finer new pores are formed, which mainly condition the structure of the foam ceramic.

EXAMPLE 1

A mixture of the following ingredients was made up with strong agitation and with addition of a sufficient amount of water to effect binding of the hydraulic binder:

| Waterglass 48/50° Be | 37.6 % |
| blast furnace slag | 12.9 % |
| kaolin | 4.1 % |
| silicon fume | 31.7 % |
| felspar | 13.7 % |
| | 100.0 % |

The percentages are calculated on the dry substance after firing.

Chemical composition of the mixture (percentages are calculated on dry substance after firing)

| $Na_2O$ | 11.2 % |
| $K_2O$ | 1.5 % |
| CaO | 1.8 % |
| MgO | 0.8 % |
| $Al_2O_3$ | 6.5 % |
| $Fe_2O_3$ | 1.7 % |
| $SiO_2$ | 76.3 % |
| $TiO_2$ | 0.2 % |

When the binder has caused the mass to solidify, it was crushed and dried, whereafter the crushed and dried material was heated to a temperature of 860° C during a sufficiently long time for the mass to attain temperature equilibrium.

The obtained cooled product showed an even pore structure with close pores and had a volumetric weight of 330 kg/m³.

EXAMPLE 2

A mixture of the following ingredients was made up and treated as given in Example 1:

| Waterglass 48/50° Be | 37.5 % |
| blast furnace slag | 12.9 % |
| kaolin | 4.1 % |
| silicon fume | 31.6 % |
| artic clay | 13.9 % |
| | 100.0 % |

Percentages are calculated on dry substance after firing.

| $Na_2O$ | 10.9 % |
| $K_2O$ | 1.4 % |
| CaO | 6.3 % |
| MgO | 1.7 % |
| $Al_2O_3$ | 6.1 % |
| $Fe_2O_3$ | 1.9 % |
| $SiO_2$ | 71.1 % |
| $TiO_2$ | 0.4 % |

The obtained cooled product showed an even pore structure with close pores and a volumetric weight of 195 kg/m³.

What we claim is:

1. In the known method of producing foamed ceramics by heating an aqueous starting mixture to a temperature between 700° and 1100° to form a sintered porous mass, said aqueous starting mixture containing components which are know to form a viscous, sintered and porous mass upon being heated to said temperature, the improvement which comprises:

a. incorporating into said aqueous starting mixture a material selected from the group consisting of blast furnace slag, Portland cement and aluminate cement, b. allowing said admixture of step (a) to set for a sufficient time for said admixture to form a unitary solid mass, c. crushing the solidifed mass of step (b) into granules with a size of 1 – 20 mm, d. subjecting the granules of step (c) to a first stage heating at a temperature below about 700° C in order to effect water removal and primary pore formation, e. subjecting the product resulting from step (d) to a further heating at a temperature within the range of 700° – 1000° C so that the pores formed during the first stage heating are partly destroyed and finer new pores are formed instead, which establishes the structure of the finished foam ceramic.

2. In the known method of producing foamed ceramics by heating an aqueous starting mixture to a temperature between 700° and 1100° C to form a sintered porous mass, said aqueous starting mixture containing components which are known to form a viscous, sintered and porous mass upon being heated to said temperature, the improvement which comprises:
   a. incorporating into said aqueous starting mixture a hydraulic binder or latent hydraulic binder,
   b. allowing said admixture of step (a) to set for a sufficient time for said admixture to form a unitary solid mass,
   c. crushing the solidified mass of step (b) into granules with a size of 1 – 20 mm,
   d. subjecting the granules of step (c) to a first stage heating at a temperature below about 700° C in order to effect water removal and primary pore formation,
   e. subjecting the product resulting from step (d) to a further heating at a temperature within the range of 700° – 1000° C so that the pores formed during the first stage heating are partly destroyed and finer new pores are formed instead, which establishes the structure of the finished foam ceramic.

3. A method according to claim 2 wherein the aqueous starting mixture contains at least one alkali compound in an amount such that the quantity of $R_2O$, where R is an alkali metal atom, amounts to 4 – 13% by weight, calculated on the burnt dry substance.

4. A method according to claim 2 wherein the starting mixture contains hydraulic binder containing calcium oxide in an amount within the range of 3 – 7% by weight calculated on the burnt dry substance.

5. A method according to claim 3 wherein the starting mixture contains hydraulic binder containing calcium oxide in an amount within the range of 3 – 7% by weight calculated on the burnt dry substance.

6. A method according to claim 2 wherein the starting mixture contains aluminum oxide to heighten the resistance to water of the foam ceramic, the content of aluminum oxide being at least 4% by weight calculated on the fired dry substance.

7. A method according to claim 2 wherein the starting mixture contains free or bonded oxide of trivalent ion and a reducing agent.

8. A method according to claim 2 wherein said reducing agent is carbon or carbon compounds.

9. A method according to claim 2 wherein the starting mixture contains free or bonded oxide of trivalent iron and a reducing agent, selected from the group consisting of carbon or carbon compounds, to achieve in the final stage of the heating process a finely porous structure through so-called secondary pore formation.

10. A method according to claim 2 wherein the starting mixture contains aluminum oxide in an amount of at least 4% calculated on the burnt dry substance, and free or bonded oxide of trivalent iron as well as a reducing agent.

\* \* \* \* \*